Jan. 28, 1941.  A. L. PARKER  2,229,933
VALVE
Filed July 22, 1938
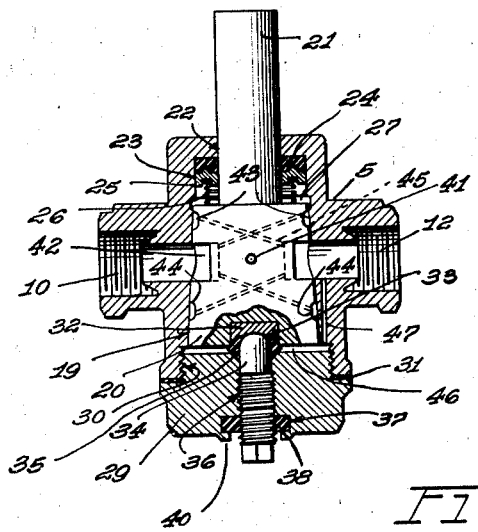
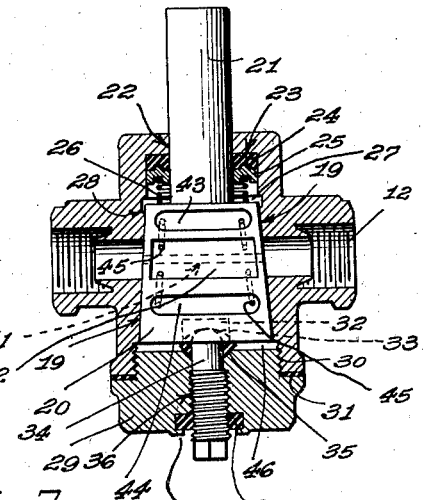
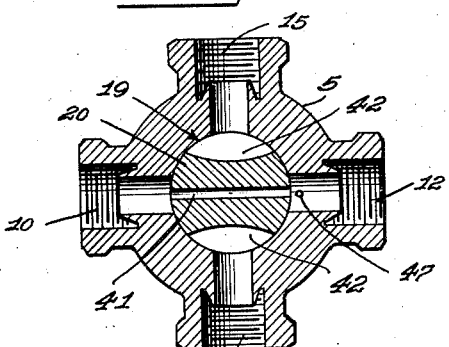
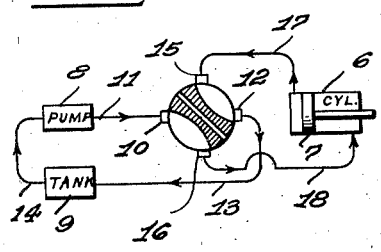
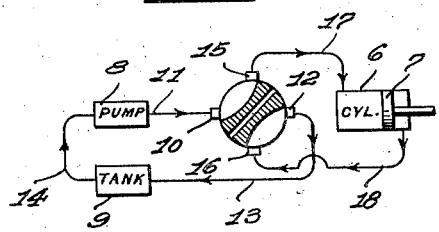
Inventor
Arthur L. Parker
By Mason & Porter
Attorneys Patented Jan. 28, 1941

2,229,933

UNITED STATES PATENT OFFICE 2,229,933

VALVE

Arthur L. Parker, Cleveland, Ohio

Application July 22, 1938, Serial No. 220,785

1 Claim. (Cl. 251—98)

The invention relates generally to valves intended for use in high pressure hydraulic circuits and primarily seeks to provide a novel valve structure including a tapered rotary plug and means for assuring free turning of the plug despite the high pressures to which the plug is subjected.

When a tapered valve plug is installed in a circuit of the character stated, the pressure of the incoming fluid forces the plug tightly against the opposite side of the valve casing, causing the plug to turn hard and wear quickly.

An object of the invention is to provide means for balancing pressures at opposite sides of the valve plug so as to avoid the objectionable hard turning and quick wearing of the valve plug.

Another object of the invention is to provide means for allowing pressure fluid to leak into a chamber above the small end of the plug and to provide for relief of pressure at the large end of the plug, thus tending to unseat the plug and permit free turning thereof.

With the above and other objects in view which will more fully appear, the nature of the invention will be more clearly understood by following the description, the appended claim, and the several views illustrated in the drawing.

In the drawing:

Figure 1 is a central vertical section of the valve.

Figure 2 is a central vertical section of the valve taken at right angles to the section illustrated in Figure 1.

Figure 3 is a central horizontal section of the valve, the valve being shown in the off position.

Figure 4 is a detail cross section of the screw sealing and locking washer.

Figures 5 and 6 are diagrammatic horizontal sections illustrating the valve connected in a high pressure hydraulic system.

The improved valve includes a casing 5 and in this particular disclosure is a valve of the 4-way type adaptable to use in a high pressure hydraulic system such as might be employed in hydraulic presses. In such a system there is included a cylinder 6 having a piston 7 mounted for reciprocation therein, a pump 8 for applying hydraulic pressure alternately at opposite sides of the piston under control of the valve forming the subject matter of this application, and a tank 9 in which the pressure fluid is impounded.

The valve casing 5 includes a high pressure inlet 10, which may be connected by a line 11 with the pressure side of the pump, and a low pressure outlet 12 which may be connected by a line 13 with the tank, said tank being connected by a line 14 with the pump intake. The valve casing also includes flow ports or passages 15 and 16 which may be alternately connected through lines 17 and 18 with the respective ends of the cylinder for alternately directing fluid into said cylinder ends at the high pressure developed by the pump. The high pressure hydraulic circuit is diagrammatically illustrated in Figures 5 and 6 of the drawing.

The valve casing includes a tapered bore 19 in which a tapered valve plug 20 is rotatably adjustable, the steam 21 of the plug being extended from the small end of the plug through an opening 22 in the casing. Within the casing the stem opening 22 is surrounded by a counterbore 23 in which is mounted a packing ring 24 formed of any suitable yieldable composition material. The packing ring is opposed by a metal spreader ring 25, and a coil spring 26 is interposed between the small end of the plug and the ring 25 and serves to constantly urge the ring 25 into spreading engagement with the yieldable packing ring.

At its small end the plug is surrounded by a pressure chamber 27 which extends slightly below the extremity of the plug as at 28.

A closure cap 29 is threadedly mounted as at 30 in the lower end of the casing, a suitable gasket 31 being interposed between the cap and the end of the casing.

A seat core 32 is carried by the lower end of the valve plug and includes a concave seat 33 engageable with a rounded end of an adjustable screw 34 surrounded by a sealing washer 35 of any suitable yieldable composition material. The screw is threadably mounted as at 36 in the cap 29 and the threaded bore in which the screw is mounted is surrounded by a counterbore 37 in which a sealing and screw locking washer 38 is mounted. The washer includes a normally non-threaded bore 39 into which the screw is threaded. By causing the screw to form its own receiving thread in the washer, the washer serves as a lock washer which effectively secures the screw against loss of adjustment. The washer is secured in the counterbore by upsetting the metal of the cap as indicated at 40.

The plug is equipped with a by-pass bore 41 which passes centrally through the plug and communicates with the outlets 10 and 12 of the casing when the valve plug is in the closed position shown in Figure 3. The plug also includes side cutouts 42 for alternately communicating between the casing ports 10, 15 and 12, 16 or 12, 15 and 10, 16, as illustrated in Figures 5 and 6 of the drawing.

Above each side cutout 42 at each side of the plug the plug is provided with a recess or cutout portion 43 extending part way around the plug as illustrated in Figures 1 and 2 of the drawing. Similar cutouts 44 are similarly positioned below the cutout 42. Each of the recesses or cutouts 43, 44 is connected by a duct 45 with the side cutout 42 at the opposite side of the plug.

The chamber 46 below the plug communicates through a relief duct 47 with the low pressure outlet 12, as shown in Figures 1 and 3 of the drawing.

When a tapered valve plug is installed in a circuit such as is diagrammatically illustrated in Figures 5 and 6 of the drawing, the pressure of the fluid in the line 11 forces the plug tightly against the opposite side of the valve casing. This causes the plug to turn hard and wear quickly. By reason of the provision of the recesses or cutouts 43, 44 and the ducts 45 by which each such recess communicates with a side cutout 42 at the opposite side of the plug, the pressures at opposite sides of the plug are balanced and hard turning and quick wearing of the plug will be avoided. The combined area of each pair of the balancing or side pressure cutouts 43, 44 is equal to the vertical area of each side pressure cutout or recess 42 and the fluid pressure on the plug will therefore be the same on both sides and the plug will be balanced within the valve casing.

In this valve no direct communication is afforded between the high pressure inlet and the chamber above the plug. Thus pressure tending to unseat the plug is provided only by the spring 26 and by such fluid pressure as may have built up in the chamber in which the spring is mounted by reason of leakage of fluid about the sides of the plug. Any fluid pressure which may tend to build up in the chamber beneath the plug due to fluid leakage about the plug, will be relieved through the duct 47.

It is of course to be understood that the details of structure and arrangement of parts may be variously changed and modified without departing from the spirit and scope of my invention.

I claim:

In a four-way valve, a casing having a plug chamber, a high pressure inlet and a low pressure outlet and two other flow ports adapted to be alternately connected with the high pressure inlet and the low pressure outlet, a tapered plug rotatable in the plug chamber and having provision for controlling passage of fluid through said inlet and outlet ports and including a side cutout formed directly in each side thereof, one disposed for cooperation with each of the high pressure inlet and the low pressure outlet and each being of a length for at times connecting the respective inlet or outlet with one of the other or flow ports, a pair of side pressure cutouts formed directly in said plug and disposed one above and one below each side cutout, and a straight bore duct extending across through the plug between each side pressure cutout and the side cutout at the opposite side of the plug for affording communication between each side pressure cutout and the side cutout at the opposite side of the plug, the total area of each pair of side pressure cutouts being equal to the area of each side cutout whereby to balance the pressure exerted against the plug at the respective sides thereof, means constantly tending to unseat the plug, and means for bleeding off pressure accumulation at the large end of the plug.

ARTHUR L. PARKER.